W. SHAKESPEARE, Jr.
LINE GUIDE FOR FISHING RODS.
APPLICATION FILED JUNE 22, 1908.

958,775.  Patented May 24, 1910.

Witnesses
Lulu Grunfeld
Gertrude Tallman

Inventor
William Shakespeare Jr
By Chappell & Earl
Attorneys

UNITED STATES PATENT OFFICE.

WILLIAM SHAKESPEARE, JR., OF KALAMAZOO, MICHIGAN, ASSIGNOR TO WILLIAM SHAKESPEARE, JR., COMPANY, OF KALAMAZOO, MICHIGAN.

LINE-GUIDE FOR FISHING-RODS.

958,775.  Specification of Letters Patent. Patented May 24, 1910.

Application filed June 22, 1908. Serial No. 439,793.

*To all whom it may concern:*

Be it known that I, WILLIAM SHAKESPEARE, Jr., a citizen of the United States, residing in the city and county of Kalamazoo, State of Michigan, have invented certain new and useful Improvements in Line-Guides for Fishing-Rods, of which the following is a specification.

This invention relates to improvements in line guides for fishing rods.

The main objects of this invention are: First, to provide an improved line guide for fishing rods which is very strong and rigid and durable in use, and, at the same time, one which is light and graceful in appearance and economical to produce. Second, to provide an improved line guide in which the metal parts may all be secured together by hard solder or brazing without subjecting the agate or eye proper to heat.

Further objects, and objects relating to structural details, will definitely appear from the detailed description to follow.

I accomplish the objects of my invention by the devices and means described in the following specification.

The invention is clearly defined and pointed out in the claims.

Figure 1:
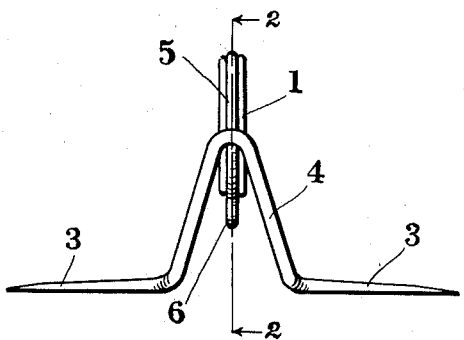
Figure 2:
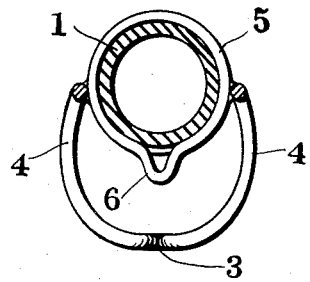
Figure 3:
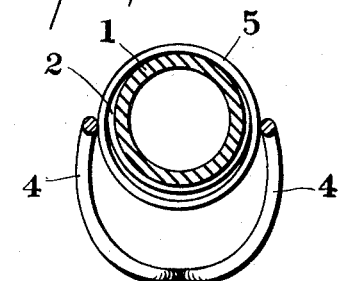
Figure 4:
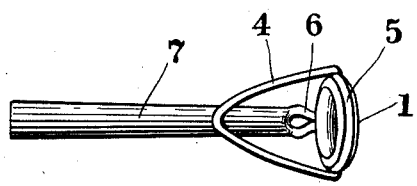
Figure 6:
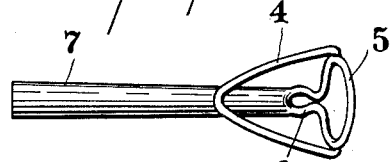
Figure 5:
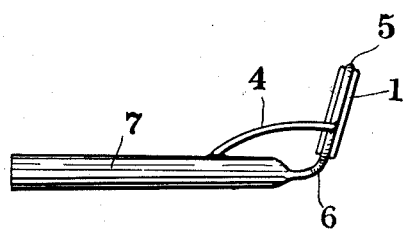
Figure 7:
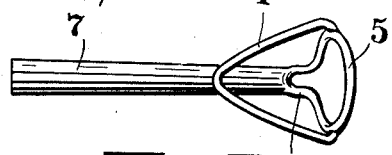

A structure embodying the features of my invention is clearly illustrated in the accompanying drawing, forming a part of this specification, in which, Figure 1 is a side elevation of my improved line guide. Fig. 2 is a vertical cross section taken on a line corresponding to line 2—2 of Fig. 1, the eye securing ring being shown in full lines. Fig. 3 is a view corresponding to that of Fig. 2, showing the eye arranged within the ring before the ring is contracted to engage the eye. Fig. 4 is a plan view of the end or tip line guide eye. Fig. 5 is a side elevation thereof. Fig. 6 is a plan view, showing the eye securing ring in its contracted form, the eye being removed. Fig. 7 is a plan view showing the eye clamping ring or band in its open form,—that is, in position to receive the eye before the band is contracted for securing the eye.

In the drawing, similar reference numerals refer to similar parts throughout the several views.

Referring to the drawing, 1 is the line guide eye, which is preferably of agate, though it may be of any suitable material. The eye 1 is provided with a peripheral groove 2. The support for the eye is provided with horizontal portions 3 adapted to be connected to the rod, having upwardly-projecting yoke-like arms 4. The support is preferably formed of two pieces of wire formed up at their centers to form the arms 4, the ends of the wire being brazed together to form the horizontal or base portions 3, by which the line guide eye is secured to the rod by winding in the usual or in any desired manner. The eye clamping or securing ring 5 is large enough to readily receive the eye 1 and is clamped or contracted thereon in securing the eye by means of a loop-like fold in the under side thereof. By this arrangement, the parts forming the support may be brazed together and the securing ring 5 may be brazed or hard soldered to the arms and the eye secured after this is done so that the eye is not subjected to heat. At the same time, it is rigidly held in place and effectively banded to prevent its splitting or its being injured from blows or strains.

In the tip line guide eye, shown in Figs. 4 and 7, the support is in the form of a tip ferrule 7, to which the arms 4 are secured. The clamping ring 5 is brazed or otherwise secured to these arms, the ring being arranged between them, the same as in Figs. 1, 2 and 3. The fold 6 in the ring is preferably turned rearwardly and secured to the end of the ferrule 7 by soldering or brazing. This securing ring 5 is of sufficient size to freely receive the eye 1 and the eye is secured therein by collapsing or contracting the fold 6, it being left open, as shown in Fig. 7, previous to its being contracted to clamp the ring.

By this simple means, I secure a line guide eye which is attractive in appearance and light in weight, and, at the same time, one which is strong and rigid.

As stated before, the support and securing ring may be secured together by hard solder or brazing without subjecting the agate or eye proper to heat which is a very great advantage when agate or other expensive materials are used to form the eye proper. A further advantage is that, if desired, a large quantity of supports may be manufactured and the guides quickly completed by the insertion of agate or eyes proper, as desired, which avoids the necessity of carrying a large stock of the expensive eye parts. As will be obvious, the eye can be inserted and secured very quickly.

My improved line guide has the further advantage of being very economical in the matter of materials and labor in constructing and assembling.

Having thus described my invention, what I claim as new and desire to secure by Letters Patent is:

1. A line guide for fishing reels comprising a line guide eye having a peripheral groove therein; a support provided with a pair of upwardly-projecting arms; and a securing ring for said eye arranged between and secured to said arms, said ring being contracted by a fold in the under side thereof into the groove of the eye whereby the eye is secured and supported.

2. A line guide for fishing reels comprising a line guide eye; a support provided with a pair of upwardly-projecting arms; and a securing ring for said eye arranged between and secured to said arms, said ring being contracted by a fold in the under side thereof upon said eye whereby the eye is secured and supported.

3. In a line guide for fishing reels, the combination with a line guide eye having a peripheral groove therein, of a support therefor comprising a base portion and a ring or band for said eye mounted thereon, said ring being continuous and contracted by a fold therein into the groove of the eye whereby the eye is secured to said support and supported thereby, said base being connected to said ring at each side of the said loop thereof.

4. In a line guide for fishing reels, the combination with a line guide eye, of a support therefor comprising a base portion and a ring or band for said eye mounted thereon, said ring being continuous and contracted by a fold therein upon said eye whereby the eye is secured to said support and supported thereby, said base being connected to said ring at each side of the said loop thereof.

5. In a line guide for fishing reels, the combination with a line guide eye having a peripheral groove therein, of a support therefor comprising a ferrule; a pair of upwardly-projecting arms secured to said ferrule; and a securing ring for said eye arranged between and secured to said arms, said ring having a loop or fold in the under side thereof, the end of said loop or fold being secured to the end of said ferrule, said ring being contracted by compressing said fold into the groove of the eye whereby the eye is secured and supported.

6. In a line guide for fishing reels, the combination with a line guide eye, of a support therefor comprising a ferrule; a pair of upwardly-projecting arms secured to said ferrule; and a securing ring for said eye arranged between and secured to said arms, said ring having a loop or fold in the under side thereof, the end of said loop or fold being secured to the end of said ferrule, said ring being contracted by compressing said fold upon said eye whereby the eye is secured and supported.

7. In a line guide for fishing reels, the combination with a line guide eye having a peripheral groove therein, of a support therefor; and a ring for securing said eye to said support, said ring being continuous and having a loop or fold in the under side thereof, the end of said loop or fold being secured to said support, said ring being contracted by compressing said fold into the groove of the eye, said base being connected to said ring at each side of the said loop thereof.

8. In a line guide for fishing reels, the combination with a line guide eye, of a support therefor; and a ring for securing said eye to said support, said ring being continuous and having a loop or fold in the under side thereof, the end of said loop or fold being secured to said support, said ring being contracted by compressing said fold upon said eye, said base being connected to said ring at each side of the said loop thereof.

In witness whereof, I have hereunto set my hand and seal in the presence of two witnesses.

WILLIAM SHAKESPEARE, JR. [L. S.]

Witnesses:
LUELLA GREENFIELD,
PHINA WOODRUFF.